United States Patent [19]

Robison

[11] 4,277,804
[45] Jul. 7, 1981

[54] SYSTEM FOR VIEWING THE AREA REARWARDLY OF A VEHICLE

[76] Inventor: Elburn Robison, P.O. Box 788, Shawnee, Okla. 74801

[21] Appl. No.: 117,174

[22] Filed: Jan. 31, 1980

Related U.S. Application Data

[63] Continuation-in-part of Ser. No. 956,695, Nov. 1, 1978, abandoned.

[51] Int. Cl.³ .............................................. H04N 7/18
[52] U.S. Cl. ................................... 358/108; 358/229
[58] Field of Search ................. 358/100, 108, 229, 93

[56] References Cited

U.S. PATENT DOCUMENTS

3,689,695  9/1972  Rosenfield ........................... 358/108

FOREIGN PATENT DOCUMENTS

250218    3/1964   Australia ................................. 358/100
2302648   9/1976   France .................................... 358/108
881000   11/1961   United Kingdom .................... 358/229
934037    8/1963   United Kingdom .................... 358/108

OTHER PUBLICATIONS

"Electronic Whiz Kids Display Better Ideas for Building Cars", Mason–Electronic Design 20, Sep. 28, 1972, pp. 38 and 40, 358–393.

Primary Examiner—John C. Martin
Assistant Examiner—Michael A. Masinick
Attorney, Agent, or Firm—Norman B. Rainer

[57] ABSTRACT

An undistorted view of regions rearward of a vehicle such as a tractor-trailer is provided by a closed circuit television system wherein a television camera having a wide angle viewing capability is positioned at the rear of the vehicle at an effective viewing elevation between about 20% and 70% of the total height of the vehicle. The camera is protected against debilitating factors by a protective enclosure which occupies minimal space and affords secure attachment to said vehicle by virtue of a mounting wherein the axis of said camera lens is horizontally disposed in a plane perpendicular to the longitudinal axis of said vehicle. A mirror associated with said camera lens at a 45 degree angle thereto serves the two-fold purpose of permitting the desired mode of mounting of said enclosure, and reversing the image presented to said camera.

The camera is connected by means of electrical wires to a television receiver positioned within easy view of the driver of the vehicle.

10 Claims, 5 Drawing Figures

SYSTEM FOR VIEWING THE AREA REARWARDLY OF A VEHICLE

This application is a continuation-in-part of application Ser. No. 956,695 filed Nov. 1, 1978 by the same inventor, now abandoned.

BACKGROUND OF THE INVENTION

1. Field of the Invention

The present invention concerns a system to be used on an automotive vehicle whereby the driver of said vehicle is provided with an improved view of the region rearward of the vehicle. The system comprises a closed circuit television system specially adapted for use on an automotive vehicle.

As is well known, automotive vehicles have one or more "blind spots" or areas where the driver or operator is unable to see an object behind the vehicle he is operating. This is particularly the case when the vehicle is comprised of a drive or tractor unit pivotably attached to a trailered cargo unit. In such instances, the driver, seated in the drive unit may not secure an adequate view of regions behind his vehicle by conventional rear-view mirrors.

The need for an adequate view of regions behind the vehicle is particularly necessary when the vehicle is in reverse motion as when backing toward a loading dock or into a parking space. In such situations, the view must be not only complete but in proper perspective, thereby permitting the driver to accurately manipulate the vehicle. The use of a television camera equipped with a wide angle lens and mounted at the rear of the vehicle may be contemplated to provide the necessary viewing function. Although wide angle lenses, having light acceptance angles of 30° to 100°, provide a greater field of view than lenses of lesser acceptance angle, they may introduce distortion of perspective, particularly if the camera is positioned in a manner to produce a view different than the driver's normal view taken on a generally horizontal line of sight from a location close to median height of the vehicle.

Certain difficulties confront the installation of operational viewing equipment such as a television camera at the rear of a vehicle, particularly in the case of commercial vehicles such as trucks.

Weather factors such as rain, ice, high wind velocities and wide extremes of temperature and humidity impose severe limitations on the durability and continued functionality of ordinary equipment. Prolonged highway travel subjects the surfaces of a truck, particularly its rear surfaces, to accumulation of dirt and contact with chemicals utilized in the de-icing of roadways. Abrasive action is experienced by virtue of sand and other particulate materials propelled against the outer surfaces of the truck by adjacent vehicles in motion. The effects of vibration and jolting must also be taken into consideration. Additional protection of equipment is required with respect to vandalism, and damage due to impact.

Although certain aspects of equipment protection can be achieved by mounting viewing equipment within a truck adjacent its rear panel, such expedient might detract from cargo space and may additionally render the equipment vulnerable to impact damage from the cargo itself. This is especially the case with cargo compartments shaped as box-like rectangular structures having a flat rear panel. The structural framework of a truck may also provide a reasonably sheltered location for the mounting of a television camera, particularly that portion of the framework located below the cargo compartment at the rear end of the vehicle. Said portions of the structural framework generally contain panel sections and are frequently utilized for housing tail lights and turn indicator signals. However, an inside surface of the structural framework may not be able to accommodate bulky objects without interference with other components.

2. Description of the Prior Art

The use of a television camera to view the region behind a vehicle is disclosed in an article by J. F. Mason on pages 38 and 40 of Electronic Design 20, Sept. 28, 1972. It is stated at page 40 of said article that the image produced by the TV camera must be reversed to its mirror image in order to produce a view that drivers are accustomed to seeing. No specific manner of image reversal is disclosed.

A system for viewing rearwardly of a tractor-trailer vehicle by means of closed circuit television has been disclosed in U.S. Pat. No. 3,689,695 to Rosenfield. In said patent, a television camera is mounted atop a tractor or cab unit which pulls a trailered cargo compartment. Even though the camera is provided with a complex adjustable positioning system, its location atop the cab unit makes it impossible to view the region directly adjacent the rear of the trailered compartment.

Another system for viewing rearwardly of a tractor-trailer vehicle utilizing closed circuit television is disclosed in British Pat. No. 934,037 which utilizes a television camera mounted within a towed cargo trailer adjacent the top of the rear panel thereof. Although the camera is sheltered, its high position, chosen presumably to minimize interference with cargo, necessitates a downward camera angle to view the ground adjacent the rear of the trailer. Said downward angle produces views contrary to the driver's customarily perceived view.

French Pat. No. 2,302,648 discloses the use of a television camera for visual surveillance in buildings such as banks. In order to occupy minimal space behind a wall, the camera is mounted in sideways position to the rear of said wall. To facilitate scanning of a wide area, the camera is vertically oriented below a pivotably adjustable mirror located opposite a transparent window in side wall. Although an inverted image is produced by such arrangement, undisclosed means are presumably utilized to correct said image.

The use of a protective enclosure for a television camera has been disclosed in Australian Pat. No. 250,218.

It is an object of the present invention to provide a closed circuit television system for viewing rearwardly of an automotive vehicle. It is another object to provide a closed circuit television system for viewing rearwardly of an automotive vehicle, said system utilizing a television camera positioned so as to secure adequate view and perspective of regions rearwardly adjacent said vehicle. It is a further object of this invention to provide a closed circuit television system of the aforementioned nature wherein the television camera is mounted to an inside surface adjacent the rear of a cargo compartment and protected against the debilitating effects of weather and highway useage. It is a still further object to provide a closed circuit television system of the aforesaid nature utilizing a protected television camera mounted to an inside surface of a rear panel of a cargo compartment and which does not significantly intrude into said compartment.

These objects and other objects and advantages of the invention will be apparent from the following description.

SUMMARY OF THE INVENTION

The above and other beneficial objects and advantages are accomplished in accordance with the present invention by an improved closed circuit television system which comprises a television camera mounted at the rear of an automotive vehicle, a television receiver or display unit positioned to be viewed by the driver in a forward region or compartment of the vehicle, and wiring which interconnects the camera with the receiver and a source of electrical energy.

This invention is based in part on the discovery that proper viewing perspective is achieved only when the view secured by the television camera is taken at a site between 20% and 70% of the total height of the vehicle, and the viewing axis does not deviate more than 30 degrees from horizontal.

The camera, comprising a lens connected to a camera body, is positioned within a protective enclosure mounted to an inside surface of a substantially vertical structural panel adjacent the rear of the vehicle. Suitable inside surfaces include for example that surface of a rear panel or door of a cargo section which is directed toward the interior of said cargo section, and that surface of the lower rear framework which is directed toward the front of the vehicle. The protective enclosure, having a transparent window to admit light to said lens, is mounted in a position such that the axis of the lens of the confined camera is horizontal and in a plane perpendicular to the longitudinal axis of the vehicle. Deflecting means such as a mirror, mounted generally between said lens and said window, deflects light at substantially a 90 degree angle, whereby light incident at a right angle to said camera is caused to enter said lens. An aperture in said structural panel to which the protective enclosure is mounted admits light to said window, said aperture being located at a site between 20% and 70% of the total height of the vehicle.

This invention is based in part on the further discovery that, if a television camera is mounted in sideways disposition to a rear panel surface of a vehicle in order to minimize the space requirements of the camera, the selection of a horizontal disposition of said camera and the placement of a 90 degree reflecting mirror in front of the lens of said camera permit transmission of an image to the vehicle operator which is equivalent to the image he is accustomed to seeing in a conventional rear-view mirror. The 90 degree reflecting mirror, in conjunction with the afore-mentioned specific system, therefore serves two purposes, namely: (1) permits the camera to be mounted sideways against a substantially vertical rear panel surface of a vehicle, and (2) reverses from left to right the image that would otherwise be produced by said camera if its lens were pointed directly behind said vehicle.

The camera is connected to the receiver by a conventional wiring circuit. In certain embodiments the wiring is provided with an easily connectible plug receptacle to permit facile separation and re-connection of the wiring circuit.

In a preferred specific embodiment, cover means may be provided to protectively shield the aperture in the structural panel when the viewing system is not in use, said cover means being activated by electrical means controlled from the driver's compartment. In a still further embodiment, said aperture contains a transparent window flush mounted with the outer surface of said panel, and means for eliminating the accumulation of water on said window.

BRIEF DESCRIPTION OF THE DRAWINGS

In the accompanying drawing forming a part of this specification and in which similar numerals of reference indicate corresponding parts in all the figures of the drawing.

DESCRIPTION OF THE PREFERRED EMBODIMENTS

Figure 1:
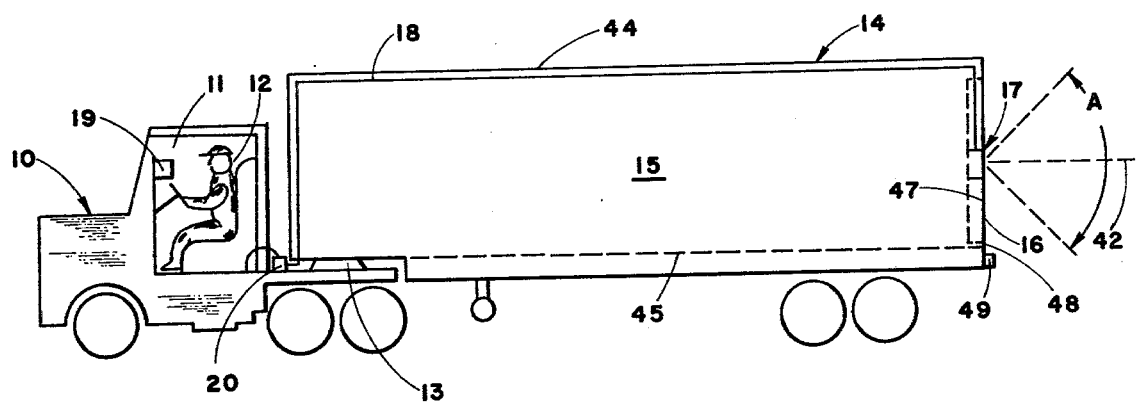
FIG. 1 is a side view of an automotive vehicle incorporating the viewing system of this invention.
Figure 3:
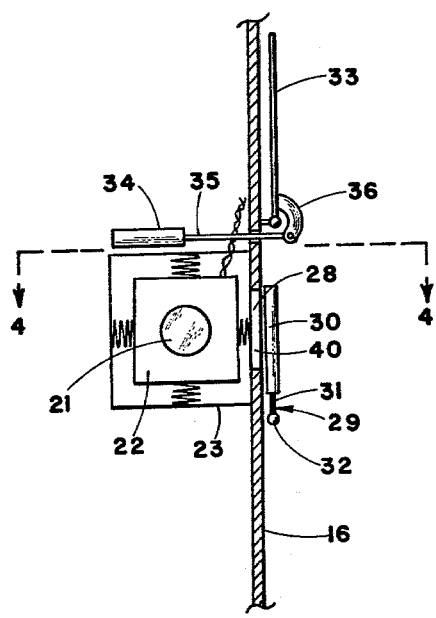
FIG. 3 is a side elevational view of the camera assembly of FIG. 2.

FIG. 1 illustrates an automotive vehicle of tractor-trailer design embodying the viewing system of this invention. The tractor or drive member 10 includes a cabin compartment 11 which accommodates the driver 12 and the basic controls for the operation of the vehicle. The tractor members is connected by pivoting coupling 13 to the trailer member 14 which comprises a rectangular cargo compartment 15 bounded on four sides by relatively thin, flat vertical panels having closure means such as doors which afford controlled access to the cargo space, and bounded on top by a flat roof structure 44, and bounded from below by a load-supporting floor 45, shown in phantom outline. A television camera assembly 17 is mounted to an inside surface 47 of rear panel door 16. A framework panel 48 extends below door 16 and floor 45 as a continuation of the rear surface of cargo compartment 15. A bumper 49 is mounted adjacent the lowermost extremity of framework panel 48.

The camera assembly 17 has a viewing axis 42 which bisects its angle of light acceptance, shown as angle A. The viewing axis shown in FIG. 1 is horizontal and coextensive with the longitudinal axis of the vehicle. The camera assembly is connected by an electrical wiring circuit 18 to a television receiver or display unit 19 mounted within the cabin compartment 11 within close view of the driver. A plug-like coupling 20 is provided within the wiring circuit to facilitate disconnection of the wiring circuit whenever the tractor member is separated from the trailer member.

Figure 2:
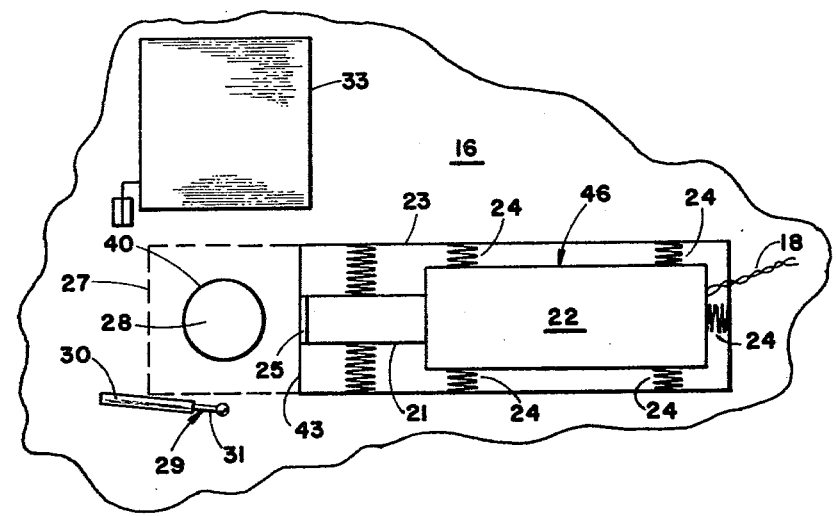
FIG. 2 is a front view of an embodiment of a television camera assembly used in the practice of this invention.
Figure 4:
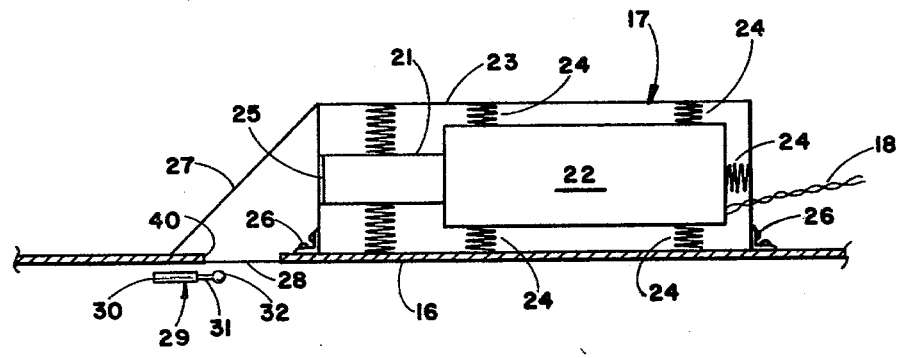
FIG. 4 is a top view of the camera assembly of FIG. 2, taken along the lines 4—4 of FIG. 3.

As shown more clearly in FIGS. 2 and 4, camera assembly 17 comprises a camera 46 consisting of a lens 21 attached to a camera body 22, said camera being housed within rectangular box-like protective enclosure 23. The protective enclosure is completely closed except for a passageway permitting emergence of the electrical wiring circuit 18, and said passageway is otherwise sealed with a resinous composition. Shock-absorbing resilient means 24, which may be springs, foamed plastics, pneumatic cushions or equivalent structures surround the camera, causing it to be substantially centrally seated within protective enclosure 23.

The front end wall 43 of said protective enclosure, directly in front of the camera lens, contains a first transparent window 25 in abutment with the forward end of lens 21. The enclosure 23 is mounted to a flat portion of the interior surface of the rear panel door 16 by means of brackets 26, shown in FIG. 4, although other mounting means such as adhesives may be employed.

Positioned directly in front of lens 21, as shown most clearly in FIG. 4, is a flat mirror 27 mounted at a 45 degree angle with respect to the lens axis. An aperture 40 in rear panel 16 is positioned in front of mirror 27 and located at a site between 20% and 70% of the height of the vehicle. A second transparent window, outer window 28, is sealed within aperture 40. Below outer window 28 on the outside of rear panel door 16 is window cleaning means 29 embodied as an oscillating wiper having rubber blade 30 attached to arm 31 that pivots about drive spindle 32. The function of window cleaning means 29 is to remove water from the outside surface of outer window 28. Other window cleaning means such as air vents and other equivalent expedients may alternatively be employed.

A protective shutter 33 is pivotably positioned above outer window 28. A solenoid 34 connected by plunger arm 35 to curved tab 36 attached to shutter 33 controls the upward and downward positioning of the shutter. In its downward position, the shutter covers outer window 28, thereby protecting it from rain, dirt, and impact damage. The periphery of the shutter may be provided with resilient gasketing so that it forms a reasonably tight fit around outer window 28.

The first window 25 of said enclosure and second window 28 in said panel may be fabricated of glass, or transparent plastic materials such as polycarbonate or polyacrylate. Said windows and mirror 27 may have perimeter contours that are round, square or of other configurations adequately sized to encompass the necessary angle of view for the camera lens. In some embodiments, the mirror 27, first window 25, or second window 28 may possess some surface curvature in order to increase the angle of view of the lens. Modification of the field of view of the camera lens may in fact be achieved by utilizing single lenses of various focal lengths as the outer window 28. Said outer window 28 may be mounted in shock-resistant mode using resilient means to absorb the energy of impacts. The outer surface of window 28 is preferably coplanar with the outer surface of panel 16, thereby facilitating the cleaning of said window by window-cleaning means 29.

Figure 5:
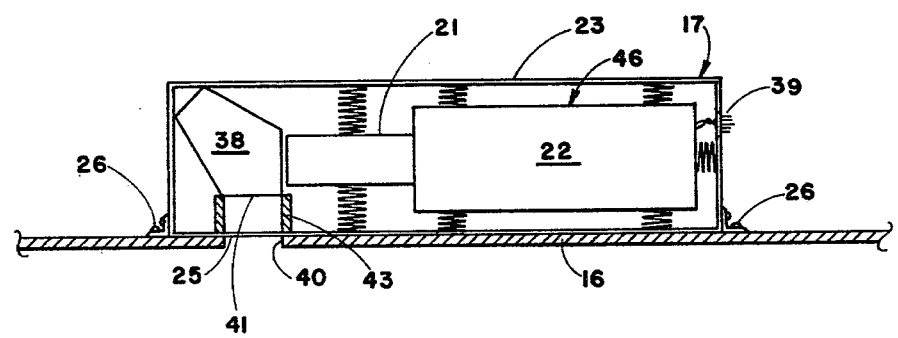
FIG. 5 is a top view of an alternative embodiment of a camera assembly of the present invention.

In an alternative embodiment of camera assembly 17, as illustrated in FIG. 5, mirror 27, may be housed within enclosure 23. A ring of resilient material 41 may be placed on the front of lens 21 to prevent hand contact with mirror 27. In such modification, first window 25 is positioned in side wall 38 of enclosure 23 in adjacent opposition to aperture 40 in panel 16. Second window 28, which fits within aperture 40 may be an integral extension of side wall 38, or may be a separate flat member adhered or otherwise attached to side wall 38. The extent of protrusion of second window 28 into aperture 40 may be adjusted by mounting brackets or otherwise to secure coplanarity of the outer face of second window 28 with the outer surface of panel 16. The perimeter gap between window 28 and aperture 40 may be filled with a caulking agent to prevent entrance of water through panel 16. An external electrical connector 39 facilitates attachment of wires 18 and permits enclosure 23 to be completely sealed, thereby avoiding problems of condensation of moisture within said enclosure. Furthermore, the entire camera assembly may be readily fastened to an inside flat surface of panel 16 by abutment with side wall 38 of enclosure 23.

The primary function of the optical deflecting means is to cause light rays from the region rearward of the vehicle to enter the lens, said lens being mounted such that its axis is horizontal and perpendicular to the longitudinal axis of the vehicle. The optical deflecting means, whether a mirror, prism or equivalents thereto will additionally cause the resultant image to be reversed from left to right, and thereby have the same appearance as the image produced by conventional rear view mirrors.

The camera is preferably one using solid state components and charge-coupled sensor devices. One such suitable camera is the Fairchild MV-201 miniature CCD television camera equipped with a C-mount lens, marketed by Fairchild Imaging Systems of Syosset, N.Y. The body of this camera has a height of 2", a width of 2¼" and a length of 3¾". With the lens in place, the overall length of the camera is about 5" to 9", depending upon the focal length of the lens employed. Since the camera of this invention requires a wide angle of view of between 30 degrees and 100 degrees, lenses having focal lengths of 5 to 25 mm would generally be utilized, and the consequent overall length of the camera would be less than about 6". By mounting the camera sideways against an inside rear panel of the truck instead of lengthwise, pointing through a rear panel, there is a saving of about 3" of space. Since the protective enclosure may add another 2" to the width of the overall camera assembly, the total protrusion of the camera assembly into a cargo compartment or into space under the structural framework of the vehicle will be less than about 5". This represents a significant reduction in space requirement over prior art installations. It should also be noted that, because the camera assembly is mounted along an entire side to the supporting structural panel and because it protrudes minimally from said panel, it enjoys a very secure mounting, and one which will resist severance by impact from cargo or other factors.

The angle of view A, is preferably between 30 degrees and 100 degrees. The viewing axis 42 shown in FIG. 1 is preferably horizontally disposed, however tilting of the viewing axis upward or downward within a vertical plane by as much as 30 degrees of angle with respect to horizontal may be utilized without significant introduction of adverse distortional effects.

The protective enclosure is fabricated of rigid material such as wood, metal or plastic. Clear plastic material such as polyacrylate is preferable because it facilitates visual observation of the condition of the enclosed camera. Also, first window 25 may be any portion of the enclosure. Although a rectangular box-like enclosure has been exemplified in the drawing, cylindrical and other shapes may be utilized provided they are reasonably close-fitting with respect to the camera, and facilitate mounting to the inside surface of a rear panel. In the case of cargo compartments having insulated walls, the protective enclosure may lie within or underneath the insulative material.

The wiring circuit, consisting essentially of a bundle of electrically conducting wires extending from the camera assembly to the television receiver in the cabin compartment is arranged in substantially the manner disclosed in FIG. 2 of Br. Pat. No. 934,037, including a plug and socket connector located near the front of the trailer. However, additional separate circuits may be added to facilitate operation of shutter 33 and wiper 29. Optionally, additional provisions may be made in the wiring to accommodate a zoom lens whose focal length would be remotely adjustable by the driver from the cabin compartment, and a variable light intensity filter. Such controls are readily accomplished by small electrical motors coupled to mechanical components in a manner well known in the art.

The television receiver is located in the cabin compartment, mounted on the dashboard or elsewhere within easy view of the driver. Conventional mounting brackets may be utilized, preferably permitting horizontal and vertical positional adjustment of the viewing screen. The various controls may be mounted directly on the television receiver or closely adjacent thereto.

By virtue of the special features of the present invention, a closed circuit viewing system is provided which gives the driver of the vehicle an undistorted view of regions rearward of his vehicle. The camera unit of the system is protected from debilitating operational hazards and is made to occupy minimal space within the cargo compartment or within the structural framework of the vehicle. Although the invention is intended primarily for use with tractor-trailer trucks, it also finds utility in recreational trailers, motor homes, van-type vehicles, boat trailers, flat-bed trailers, buses, and other vehicles.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

What is claimed is:

1. In a viewing system for observing the area rearward of an automotive vehicle having a cabin area forward of an enclosed cargo section, a substantially flat panel adjacent the rear end of said cargo section, said panel being substantially vertically disposed and perpendicular to the longitudinal axis of said vehicle, and a television circuit comprising a camera positioned at the rear of said vehicle and connected by electrical wires to a display device positioned within said cabin area, the improved features comprising:

(a) a camera assembly comprising a television camera body and associated lens housed within a protective enclosure having a first transparent window optically aligned with said lens,
    (b) said protective enclosure being mounted to an inside surface of said panel in a manner such that the axis of said lens lies horizontally in a plane perpendicular to the longitudinal axis of said vehicle,
    (c) light deflecting means positioned in front of said lens to cause light coming from behind the vehicle to bend 90 degrees to enter said lens, and further causing left-to-right reversal of the image entering said lens, and
    (d) an aperture within said panel admitting light onto said light deflecting means and positioned at a location between 20% and 70% of the total height of said vehicle.

2. The viewing system of claim 1 wherein said cabin area is pivotally joined to said cargo section.

3. The viewing system of claim 2 wherein said electrical wires are provided with plug-and-socket connecting means at a location adjacent the front end of said cargo section.

4. The viewing system of claim 1 wherein said light deflecting means comprises a reflective flat surface vertically positioned at a 45 degree angle with respect to the axis of said lens.

5. The viewing system of claim 1 wherein said aperture contains a second transparent window, the outer surface of which is coplanar with the exterior surface of said panel.

6. The viewing system of claim 5 wherein means are provided to clean said second transparent window.

7. The viewing system of claim 1 wherein said protective enclosure contains resilient means acting between said camera and the interiorly disposed surfaces of said enclosure.

8. The viewing system of claim 5 wherein said lens, in combination with said first and second windows constitutes an optical system having an angle of light acceptance of between 30 degrees and 100 degrees.

9. The viewing system of claim 1 wherein said panel is a portion of the rear of said cargo section.

10. The viewing system of claim 1 wherein said panel is a portion of the framework of said vehicle located underneath said cargo section.

* * * * *